No. 714,708. Patented Dec. 2, 1902.
W. W. JONES.
TOOTH FASTENER FOR THRESHERS.
(Application filed Apr. 23, 1901.)
(No Model.)
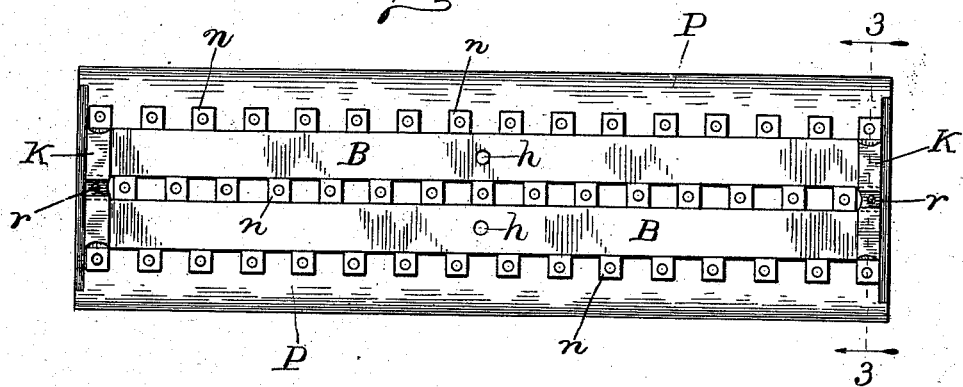
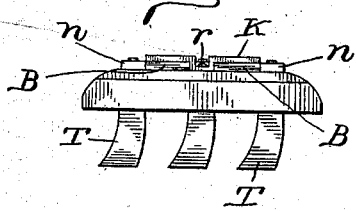
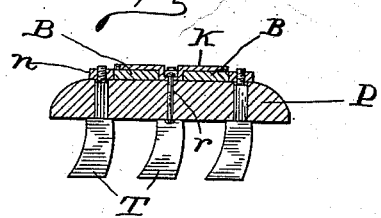
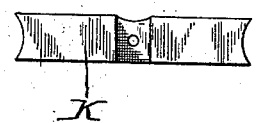
WITNESSES:
C. S. Frye
T. H. Colvin
INVENTOR
Wiley W. Jones,
BY
Chester L. Bradford,
ATTORNEY
THE NORRIS PETERS CO., PHOTO-LITHO., WASHINGTON, D. C.

UNITED STATES PATENT OFFICE.

WILEY W. JONES, OF DOWNS, KANSAS.

TOOTH-FASTENER FOR THRESHERS.

SPECIFICATION forming part of Letters Patent No. 714,708, dated December 2, 1902.

Application filed April 23, 1901. Serial No. 57,043. (No model.)

*To all whom it may concern:*

Be it known that I, WILEY W. JONES, a citizen of the United States, residing at Downs, in the county of Osborne and State of Kansas, have invented certain new and useful Improvements in Tooth-Fasteners for Threshers, of which the following is a specification.

The object of my said invention is to provide an efficient means for securing the nuts on the shanks of the teeth used in concaves of threshing-machines, which may be easily removed when it is desired to remove or repair such teeth, and which secure said teeth strongly and firmly when in position. A section of a threshing-machine concave provided with my said invention will be first fully described, and the novel features thereof then pointed out in the claims.

Referring to the accompanying drawings, which are made a part hereof and on which corresponding reference characters indicate similar parts, Figure 1 is a plan view of the back side of a section of a concave used in threshing-machines provided with my improved device for securing the nuts in place; Fig. 2, an end elevation thereof; Fig. 3, a transverse section at the dotted line 3 3 in Fig. 1, and Fig. 4 a plan view of one of the keepers.

The body or plate P and the teeth T therein are or may be of the usual or any suitable or desired form and will not, therefore, be further described herein, except incidentally in describing my said invention.

Laid between each of the rows of nuts $n$ is a bar B of suitable size to just fill the space between two adjacent rows and which will therefore hold all of the nuts securely in place. These bars are held in position by means of keepers K, which are in turn secured to the plate P by bolts or rivets $r$. These have their sides and ends which lie alongside the adjacent nuts when the parts are assembled cut away or so formed that the nuts may be turned on or off without disturbing said keepers, as best shown in Fig. 4. In constructing my improved concaves the keepers K are attached securely to the plate T and the usual teeth inserted in the nuts placed thereon. The bar B is then pushed in endwise between the rows of nuts, as shown, which holds them securely in position. In the case of the breakage of one or more of the teeth, or when for any reason it is desired to remove or replace any of said teeth, it is easily done by sliding out the bar, after which the nuts can be manipulated in the ordinary manner. This is permitted in the case of those nuts which are adjusted to the keepers by the formation of the sides and ends of the keepers, as before stated. The withdrawal of the bar B is facilitated by means of a hole $h$ therein, into which a hook on the end of a suitable handle may be inserted.

Having thus fully described my said invention, what I claim as new, and desire to secure by Letters Patent, is—

1. The combination of a plate having rows of perforations, teeth whose shanks extend through said perforations, nuts on the inner ends of said shanks, a locking-bar extending longitudinally along said plate between said nuts and locking those in both the two adjacent rows, and keepers secured to said plate and holding said locking-bar in place, whereby both said rows of nuts are held by a single bar, substantially as set forth.

2. The combination, with the perforated plate and teeth mounted therein, of a bar adapted to fit between rows of nuts on said teeth whereby said nuts are prevented from turning, and keepers for said bar arranged adjacent to certain of the said teeth, the ends and sides of said keepers being formed to permit the adjacent nuts to turn, substantially as shown and described.

3. The combination of a perforated plate having a multiplicity of rows of perforations therein, three parallel series of teeth mounted in said perforations and having their shanks extending through said plate, and each having a nut mounted upon its extended end, three parallel series of nuts being thereby formed, a pair of keepers K secured to the plate at opposite ends and each provided with a pair of deflected portions opposite and in alinement with the space between two parallel series of nuts, and a pair of bars B longitudinally movable through the keepers and filling the spaces between the adjacent series of nuts, substantially as shown and described.

In witness whereof I have hereunto set my hand and seal at Downs, Kansas, this 18th day of April A. D., 1901.

WILEY W. JONES. [L. S.]

Witnesses:
G. H. SKINNER,
F. M. WELLS.